SEMICONDUCTOR DETECTOR METHOD

Filed April 11, 1963 4 Sheets-Sheet 1

INVENTORS
GABRIEL L. MILLER
SANFORD E. WAGNER
BY
Roland A. Anderson
Attorney

INVENTORS
GABRIEL L. MILLER
SANFORD E. WAGNER
BY
Roland A. Anderson
Attorney

INVENTORS
GABRIEL L. MILLER
SANFORD E. WAGNER
BY
Roland A. Anderson
Attorney

SEMICONDUCTOR DETECTOR METHOD

Filed April 11, 1963 4 Sheets-Sheet 4

INVENTORS
GABRIEL L. MILLER
SANFORD E. WAGNER
BY
Roland A. Anderson
Attorney 3,272,668
SEMICONDUCTOR DETECTOR METHOD Gabriel L. Miller, Babylon, and Sanford E. Wagner, Brookhaven, N.Y., assignors to the United States of America as represented by the United States Atomic Energy Commission Filed Apr. 11, 1963, Ser. No. 272,497
3 Claims. (Cl. 148—177)

This invention relates to semiconductor radiation detectors and more particularly to methods and apparatus for the production of semiconductor radiation detectors having a thick depletion layer.

Since the advent of atomic energy and atomic research it has been desirable to detect incident penetrating radiation. Various proposals have been made and used for this purpose including semiconductor radiation detectors but these have not heretofore been entirely satisfactory or widely used because they have not had thick depletion layers or the production of their depletion layers has been too slow or inaccurate.

It has now been discovered that a semiconductor radiation detector with a thick depletion layer can be produced rapidly by alloying lithium into p-type silicon and reverse biasing the resulting diode structure with a constant wattage supply while extracting the Joule heat from the junction with a vapor phase coolant. Additionally, it has been discovered that by slowly cooling the junction at the end of the drifting process, the depletion layer is accurately compensated as indicated by capacitance measurements.

In another aspect, this invention provides apparatus for drifting lithium in a semi-conductor radiation detector comprising a resonant charging constant power supply having a capacitor for discharging constant energy pulses into said detector while a vapour phase coolant near its boiling point removes the heat produced in said detector by said discharge. This apparatus has the advantage of simplicity and rapid drifting. Also, it simultaneously drifts more than one detector from a single power source.

Various other advantages and novel features will now appear from the following description of an embodiment of this invention, and the novel features will be particularly pointed out hereinafter in connection with the appended claims.

Figure 1:
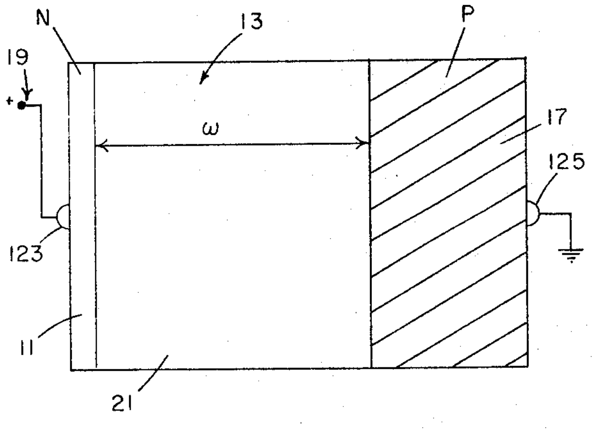
FIG. 1 is a partial cross-section of a lithium doped p-n junction undergoing the drifting process.
Figure 4:
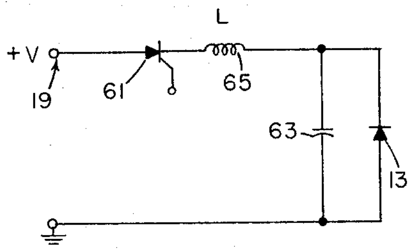
FIG. 4 is a schematic drawing of the resonant charging constant power supply system of this invention for the diode of FIG. 1.
Figure 6A:
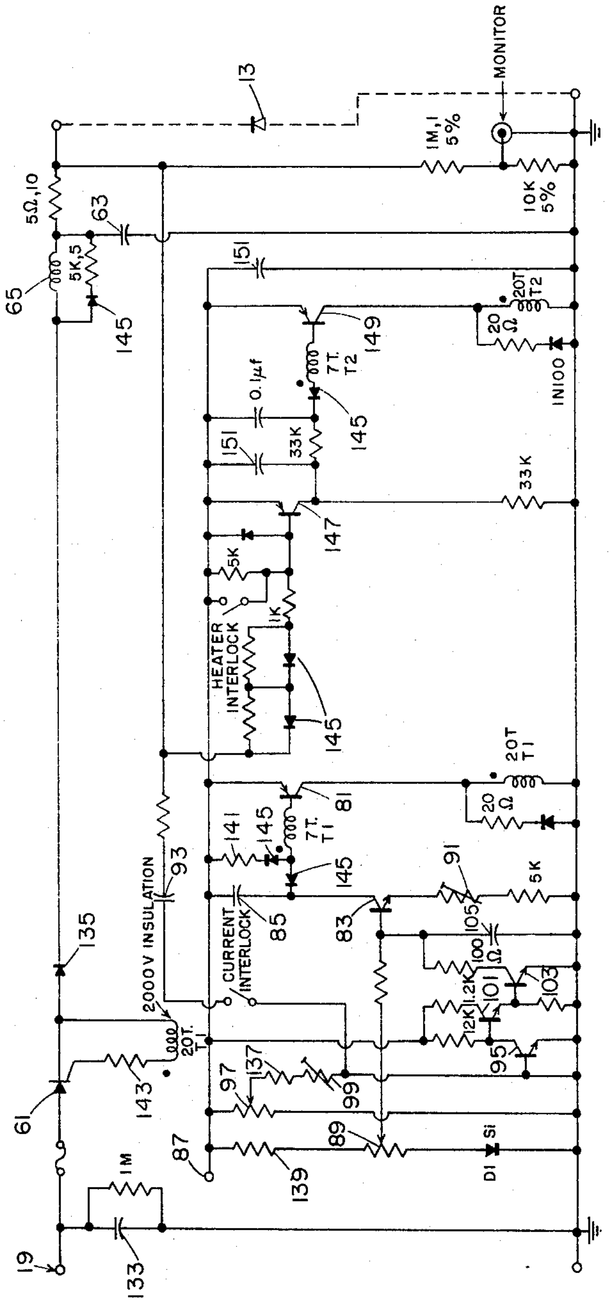
Figure 6B:
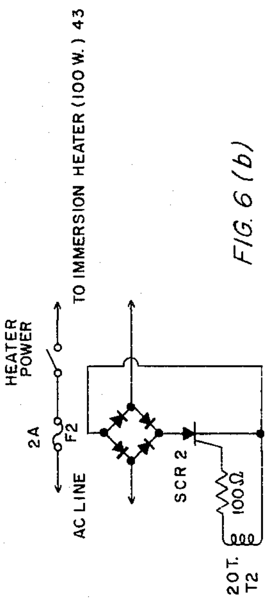

FIG 5*a* is a schematic drawing of the voltage vs. time of the diode of FIG. 1 undergoing drift;

FIG. 5*b* is a schematic drawing of the current vs. time of the diode of FIG. 1 undergoing drift;

FIG. 6*a* is a schematic drawing of the resonant charging constant power supply of FIG. 4 with controls therefor;

FIG. 6*b* is a schematic drawing of the heater power supply for the circuit of FIG. 6*a*.

Figure 7:
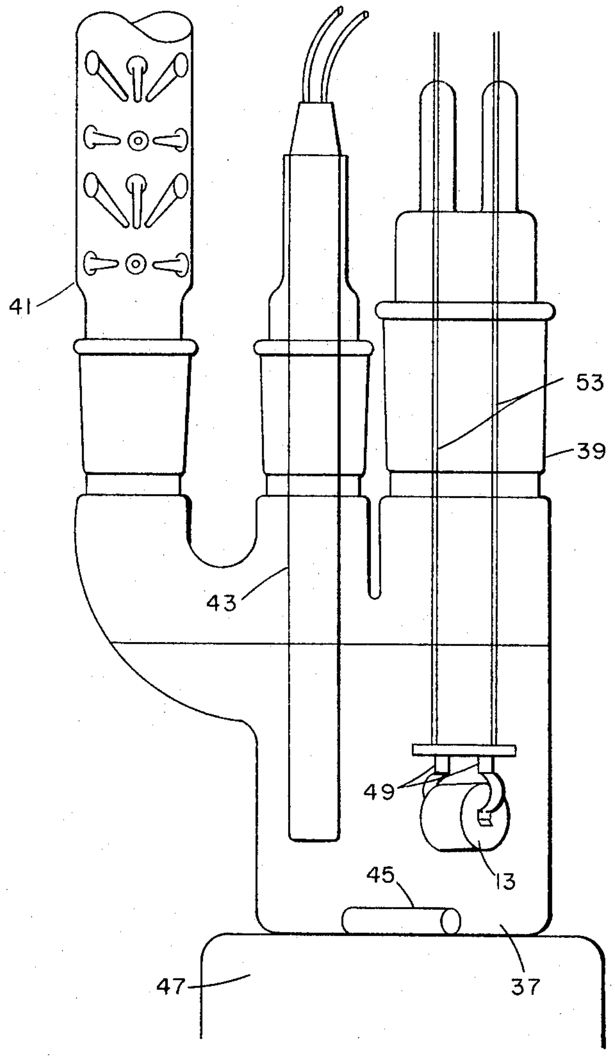
Figure 8:
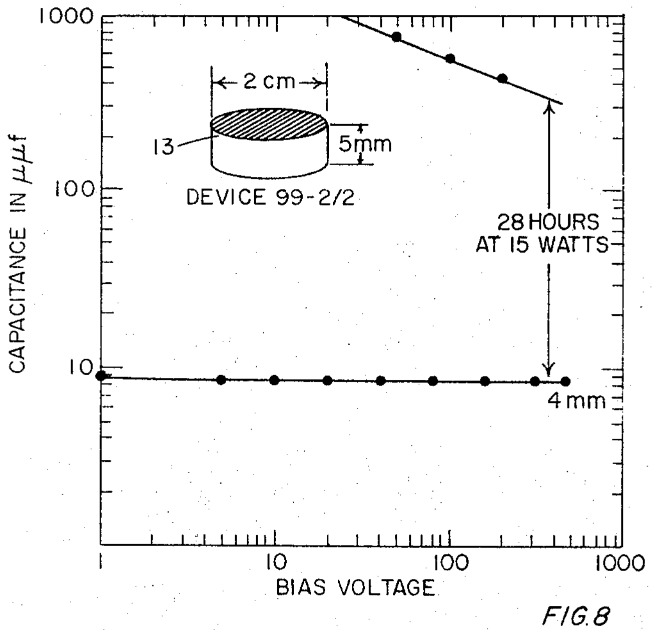
Figure 9:
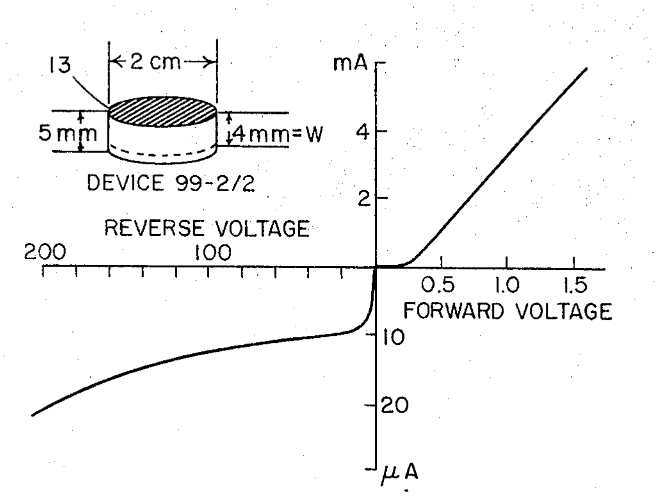

FIG. 7 is a partial side view of the vapour phase cooling drifting bath provided for the cooling fluid of this invention;

FIG. 8 is a graphic illustration of the initial and final capacitances versus voltage plots of the diode of FIG. 1 drifted in accordance with this invention;

FIG. 9 is a graphic illustration of the I–V characteristic of the diode of FIG. 1 drifted in accordance with this invention.

Referring to FIG. 1 a carefully controlled lithium alloyed n-region 11 is formed in silicon diode 13 by evaporating pure lithium onto a p-type silicon semiconductor 17 from a lithium metal source and subsequently heating the structure to ~400° C. for ~5 minutes to alloy the lithium into the p-type semiconductor. It has been found that evaporating the lithium is convenient and has the advantage of avoiding the introduction of impurities into the semiconductor.

Some of the lithium atoms from the alloyed region 11 are drifted into the p-region 17 by reverse bias source 19 whereby the lithium impurity concentration compensates for the p-type impurity concentration e.g. boron doped impurities, in a portion of the p-region 17 and forms a depletion or compensated region 21.

In order to explain how the method and apparatus of this invention accomplish the function of rapidly providing an accurate and thick depletion region 21 reference is made to the $n+p$ junction, produced by alloying lithium into the p-type silicon 17. Let $\omega$ be the depletion layer width after drifting has proceeded for some time, $\mu$ be the lithium ion mobility at the drifting temperature and V be the applied voltage. Then the rate of change of $\omega$ is given by $$\frac{d\omega}{dt}=\mu\left(\frac{V}{\omega}\right)$$

or $$\omega d\omega=\mu V dt \qquad (1)$$

At any instant a leakage current I will be flowing through the device, and both sides of the Equation 1 can be multiplied by this to yield $$I\omega d\omega=\mu I V dt$$

$$\therefore \int_0^W I\omega d\omega=\int_0^T \mu I V dt \qquad (2)$$

If the drift proceeds at constant temperature, $\mu$ is a constant and can, therefore, be brought outside the integral. The right hand side of Equation 2 is then simply $\mu$J, where J is the total number of joules dissipated in the drifting process. If the leakage current is proportional to $\omega$, the left hand side of (2) can be integrated, resulting in $$W=(K\mu J)^{1/3} \qquad (3)$$

where K is a constant.

Since all of the energy J put into the silicon semiconductor diode 13 of FIG. 1, is dissipated as heat, it follows that the maximum drift rate is dictated by the efficiency of the heat sink, and furthermore that the heat sink should be used to capacity at all times. The term $\mu$ increases roughly exponentially with temperature. Also as the temperature increases the diode 13 leakage current increases at almost exactly the same rate. Consequently the reverse bias drifting voltage has to be reduced proportionally to keep J constant, and this results in the maximum drift rate being substantially independent of temperature.

Figure 2:
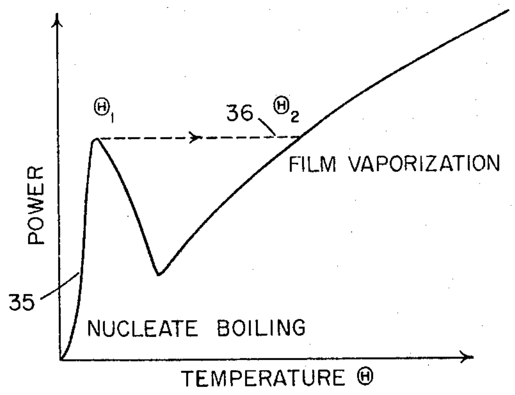
FIG. 2 is a schematic representation of a Nukiyama cooling curve and a corresponding cooling curve for the diode of FIG. 1.

Vapor phase cooling possesses an inherent thermal instability which can be understood with the help of the Nukiyama curve of FIG. 2. As the power input increases from zero heat is first carried away by convective cooling and then at higher input powers by nucleate boiling. In vapour phase up to $\Theta_1$, zone 35 in FIG. 2, the temperature is almost independent of the power input, higher powers merely resulting in more rapid and extensive bubble formation. When the power is so high that the hot surface is entirely covered with bubbles, corresponding to temperature $\Theta_1$, any further small increases in power causes rapid transition to film boiling and a much higher temperature $\Theta_2$. In this zone 36, above $\Theta_1$, the hot surface of diode 13 is entirely covered with a continuous film of vapor, and the surface of the diode 13 may be as much as hundreds of degrees above the liquid boiling point of the coolant 37. In contast to this the temperature at the first peak in FIG. 2 is characteristically only 10° C. to 20° C. above the liquid boiling point.

In a practical arrangement for accomplishing the rapid lithium drifting of diode 13 to provide a thick, accurately compensated depletion layer 21, an efficient cooling system is shown in FIG. 7. Pyrex brand glass container 39 has a refluxing column 41, an immersion heater 43, a polytetrafluorethylene coated magnet 45 having means 47 for magnetically rotating the magnet 45 to stir the cooling fluid 37 in container 39. A spring clip 49 of Phosphor bronze holds diode 13 and nickel wires 53 connect the clip ends to the reverse bias.

The FC43 and FC75 brand fluorocarbons manufactured by the Minnesota Mining and Manufacturing Co. are advantageous for cooling fluid 37. These coolants boil at ≈160° C. and 100° C. respectively, operate as efficient coolants (>100 watts inch$^{-2}$ of exposed wafer surface), keep the junction edges clean so as to minimize edge leakage, and are unreactive to silicon. These fluorocarbons have a latent heat of vaporization above at least 50 cals./gm., a surface tension below 80 dyne. cm., a viscosity of less than 5 centipoise at 20° C., and an ability to boil in container 39 from about 50° to 300° C. Water, mineral oil, and dibutyl thalate have also been used as coolants.

The resonant charging system of this invention for the reverse bias drifting source 19, is shown in FIG. 4. According to this invention, when silicon controlled rectifier 61 is turned on, the capacitor 63 rapidly charges resonantly through low resistance choke coil 65 to 2V volts from source 19 and the S.C.R. 61 then turns off as the current through the S.C.R. 61 tries to reverse. Capacitor 63 then discharges through the drifting diode 13 and the S.C.R. 61 is ready to be turned on again.

Figure 3:
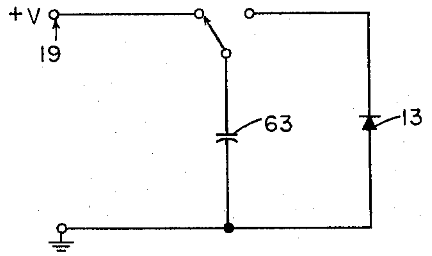
FIG. 3 is a schematic drawing of the basic constant wattage power supply system of this invention for the diode of FIG. 1.
Figure 5:
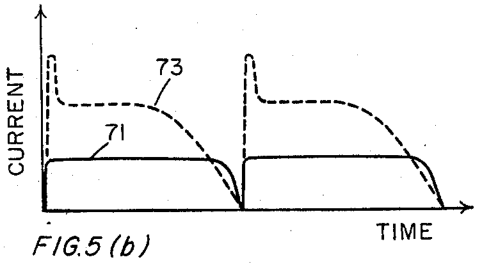

Since the energy stored in capacitor 63 is ½ CV$^2$ joules, and since W in Equation 3 depends only on energy and not on the voltage, it is readily seen that the described system gives the desired result of constant energy input, provided only that the diode 13 reverse bias leakage is large enough to discharge the capacitor 63 completely on each pulse, since the power input is ½$f$ CV$^2$, where $f$ is the switching frequency. As illustrated schematically in FIG. 3, $P=f$ (½ CV$^2$).

On first switching capacitor 63 on from source 19, with the drifting diode 13 in the cooling liquid 37 at room temperature, only a negligible leakage current flows through the diode 13. Consequently the resonant charging circuit capacitor 63 never discharges between pulses and it remains at a constant value determined by the voltage at source 19.

An immersion heater 43 is provided in the cooling liquid 37 and this heater is turned on as soon as the supply from source 19 to resonant charging capacitor 63 is switched on, and left to bring the cooling fluid 37 to a boil.

Figure 5:
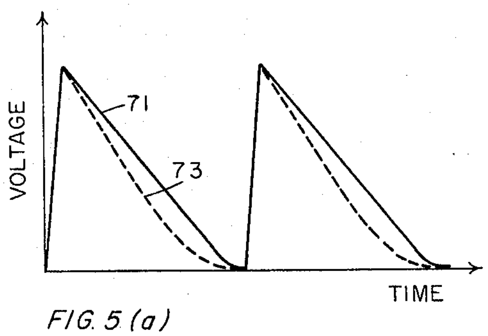

The voltage and current wave forms for diode 13 are shown in FIG. 5, ($a$) and ($b$) respectively. At the start of the drifting process, shown by solid lines 71, the capacitor 63 discharges at substantially constant current, leading to a linear voltage rundown. As the drift proceeds and the compensated region 21 becomes wider, the characteristics tend toward those shown by the dotted lines 73. The initial spike in the current wave form is associated with the thermal spike resulting from the extraction of the diode stored charge at the beginning of each pulse. The departure from a constant current discharge, shown in FIG. 5$b$, which becomes quite marked at thickness greater than ≈5 mm., is thought to be due to the increasing difficulty experienced by surface generated charge in traversing the entire depletion layer.

It will be understood from the above described resonant charging system that one or more of these power supply systems can be driven from a single silicon controlled rectifier 61 (within its power handling capability) simply by including a power diode, a choke, and a capacitor for each system. Furthermore, the capacitors need not all be the same size, so any number of diodes 13 can simultaneously be drifted at constant power from the single power supply 19. Since this was not possible, heretofore, the system of this invention results in greatly improved convenience over the drifting systems known heretofore.

In the operation of the drifting power supply of this invention, shown schematically with a heater power supply in FIGS. 6$a$ and 6$b$, the repetition frequency of the above described resonant charging circuit is controlled by blocking oscillator 81 and the constant current generator 83. At each pulse, capacitor 85 charges up a few volts above its +12 volt rail 87 and is then discharged via constant current generator 83. The magnitude of this discharging current, and hence the frequency, is set by helipot 89. Rheostat 91 is preset so that full scale on helipot 89 corresponds to 100 watts into the load (i.e. approximately 1 kc./s.).

Capacitor 93 differentiates the drifting diode 13 rundown voltage, thus providing a current at the base of transistor 95. If the discharge of the resonant charging circuit capacitor 63 becomes too rapid, the current through differentiation capacitor 93 exceeds the current bias set by helipot 97 and rheostat 99 and transistor 95 turns off. In consequence transistors 101 and 103 turn on and rapidly remove some charge from capacitor 105, reducing the base voltage of constant current generator transistor 83 and hence the current into capacitor 85. This immediately reduces the pulsing rate, and hence the power, to a safe level. Rheostat 99 is preset so that full scale on the helipot 97 corresponds to the discharging current experienced at the highest drifting power obtainable e.g. for this drifting power source 100 watts.

In the operation of the method of this invention, a silicon semiconductor 13 is used having a p-type region 17, a thin lithium alloyed n-layer 11 on top thereof, suitable contacts 123 and 125, and junction edges that have been chemically etch-polished to remove surface contamination. This diode 13 is transferred to drifting bath 39 shown in FIG. 7 with clip 49 holding the diode 13 in liquid coolant 37. Suitable electrical conductors 53 conduct current to the diode 13 from source 19. Advantageously the liquid coolant is heated to just below its boiling point, and then source 19 is turned on by a suitable switch. Thermal equilibrium is reached in about 15 minutes.

With a small drifting diode 13, it is advantageous to set the power from source 19, so that the output from the capacitor 63 causes the entire surface of diode 13 just not entirely to be covered with vapour phase bubbles caused by the boiling of the coolant 37 at the surface of the diode 13. This visual control causes the heat removal from the diode 13 to correspond with a point below $\Theta_1$ on the Nukiyama curve shown in FIG. 2. The system of this invention thus supplies power from the constant wattage power source substantially at the highest wattage consistent with the requirement that the diode 13 temperature remains to the left of the first peak i.e. $\Theta_1$, in the diagram of FIG. 2 for a time necessary to produce a compensated region 21 of a desired thickness $\omega$.

As drifting proceeds it is often possible to observe the growth of the depletion layer 21 by the advancing zone of bubble formation. This is due to the fact that the heat is generated in this region. Also, an electric field occurs across the depletion layer 21 and this attracts tiny dust particles from the coolant 37 which act as nucleating centers.

FIGURE 8 shows the initial and final capacitance plot of a representative diode 13 drifted at a rather modest power of 15 watts for 28 hours. The flatness of this final capacitance versus voltage plot indicates the great accuracy of the compensation that has been achieved. This flatness in the diode 13 of FIG. 8 is materially aided by switching off the immersion heater for the last hour of the drift. At 15 watts the bath coolant 37 slowly cools without the heater 43, down to room temperature, even though the drifting voltage remains on. If this procedure is not followed, the lithium distribution may be tilted somewhat due to the effect of the charge in transit across the detector at elevated temperature.

A representative I–V characteristic, obtained during the drifting process and immediately after removal of diode 13 from the drifting bath, is shown in FIG. 9. The relatively low reverse bias leakage of this large diode 13 shown therein, indicates the cleanliness of the fluorocarbon coolant 37, e.g. FC43 brand fluorocarbon. Moreover, these data were obtained with the original charge of fluorocarbon liquid 37 which was in continuous use for a period of many months.

This plot also evidences a low forward resistance, which is evidence of conductivity modulation, and indicates that the carrier lifetime in the compensated material 21 is very long.

In actual practice, the cube root of the relation predicted by Equation 3 has been found to hold quite accurately up to $\approx$3 mm. and this confirms that the leakage current is proportional to the drifted width $\omega$ of depletion layer 21. At greater thickness this leakage current has been found to increase progressively more slowly than $\omega$, leading ultimately to a square root dependance of $\omega$ on time at a constant power. In this case, a starting material of 300Ω cm. p-type silicon was used having a 2 cm.$^2$ crystal cross-sectional area, and this diode 13 was drifted to a depletion layer 21 depth of 1.1 cm. in 10 days at 45 watts.

Advantageously the diode 13, with a drifted depletion layer 21 depth of $\approx$4 mm., and a $\approx$1 mm. p-type back contact portion 17 has been diced and the pieces have been used sideways on after lapping and etch-polishing the exposed sides to remove cutting damage. This system has the advantage that no further working of the contacts has been required and the existing nickel or lithium-rich silicon and nickel on uncompensated p material form excellent and rugged contacts 123 and 125. Alternatively by removing the p-type region 17, and evaporating gold on the lithium drifted area 21, a surface barrier contact can be used.

In operation, diode 13 has been successfully employed with a suitable reverse bias source to detect nuclear products. Typically line widths for a device of 1 cm.$^2$ area and 3 mm. depletion depth have been 50 kev. F.W.H.M. at room temperature and 10 kev. F.W.H.M. at Dry Ice.

An ionizing particle penetrating this depleted region because of the presence of the electric field, supplied by 21 will leave a trail of hole-electron pairs within that region 21 and these hole-electron pairs will be swept out the reverse bias source and the resulting quantity of charge will flow into a conventional external circuit having a multi-channel pulse height analyser (not shown) which indicates the number and energy of the penetrating particles since the height of these pulses corresponds to a certain particle energy.

Suitable values and part numbers for the components of FIG. 6 are as follows:

| | | | |
|---|---|---|---|
| 19 | D.C. Source | | +300 volts. |
| 61 | SCRI | 3RC30 | |
| 63 | Capacitor | | 1.0μf. |
| 65 | Choke | | 1 MH. |
| 81 | Blk Osc | 2N586 | |
| 83 | C.C. gen | 2N338 | |
| 85 | Capacitor | | 0.5μf. |
| 87 | Source | | +12V. |
| 89 | Helipot | | 1K. |
| 91 | Rheostat | | 20K. |
| 93 | Capacitor | | 2000pf. |
| 95 | Transistor | 2N1091 | |
| 97 | Helipot | | 1K. |
| 99 | Rheostat | | 10K. |
| 101 | Transistor | 2N1091 | |
| 103 | do | 2N1091 | |
| 105 | Capacitor | | 10μf. |
| 133 | do | Paper | 10μf. |
| 135 | Diode | IN2232A | |
| 137 | Resistor | | 5K. |
| 139 | do | | 200Ω. |
| 141 | do | | 100Ω. |
| 143 | do | | 100Ω. |
| 145 | Diode | 1N2071 | |
| 147 | Transistor | 2N414 | |
| 149 | do | 2N586 | |
| 151 | Capacitor | | 10μf. |

Semiconductor radiation detectors having a lithium drifted high resistance depletion layer made in accordance with this invention, have withstood high reverse biases and in actual practice have produced output pulses corresponding substantially linearly with incident penetrating radiation energy over a broad range of particle energies.

This invention has the advantage of providing increased depletion layer thickness and the detection of increased particle energies over an increased energy range. This invention provides a lithium drifted silicon semi-conductor detector and a method and apparatus for drifting these semiconductors in much shorter times than was possible heretofore. Additionally, this invention has the advantage that several semiconductors may be drifted at the same time from the same power supply.

What is claimed is:

1. A method for producing a semiconductor radiation detector, comprising alloying lithium into p-type silicon, reverse biasing the alloyed structure with a constant wattage supply, and simultaneously removing Joule heat generated in said detector by said reverse biasing with a vapour phase coolant in which said semiconductor is immersed.

2. A method for producing a semiconductor radiation detector, comprising evaporating lithium on p-type silicon, alloying the lithium into the p-type silicon to produce n-type silicon, pulsing a reverse bias voltage on the detector to drift a portion of the lithium from said n-type region into said p-type silicon sufficiently to produce a compensated layer, and removing the Joule heat generated in said detector with a liquid coolant, said coolant being maintained near its boiling point and said detector being near the temperature of the coolant so as to lead to cooling by vaporization of the liquid.

3. A method for producing a semiconductor radiation detector, comprising alloying n-type lithium into p-type silicon to produce an n-type region having a p-n junction with said p-type silicon, pulsing a reverse bias voltage in constant energy pulses through the detector to produce a lithium drifted compensated layer in said detector, removing heat generated in said detector by said reverse bias voltage with a vapour phase coolant, maintaining the surface of said detector and its adjacent coolant near the boiling point of said coolant for a time sufficient to produce said lithium drifted compensated layer, and slowly cooling said coolant to room temperature at the end of said production of said lithium drifted depletion layer.

References Cited by the Examiner

UNITED STATES PATENTS

| | | | |
|---|---|---|---|
| 2,746,742 | 5/1956 | Comley | 266—5 |
| 2,752,148 | 6/1956 | Kincaid et al. | 266—5 |
| 2,929,751 | 3/1960 | Blakelock | 148—177 |
| 2,940,878 | 6/1960 | Plust et al. | 148—177 |

DAVID L. RECK, *Primary Examiner.*

HYLAND BIZOT, R. O. DEAN, *Assistant Examiners.*